C. J. WHITE.
PLOW STRUCTURE.
APPLICATION FILED FEB. 21, 1919.
1,359,850.
Patented Nov. 23, 1920.
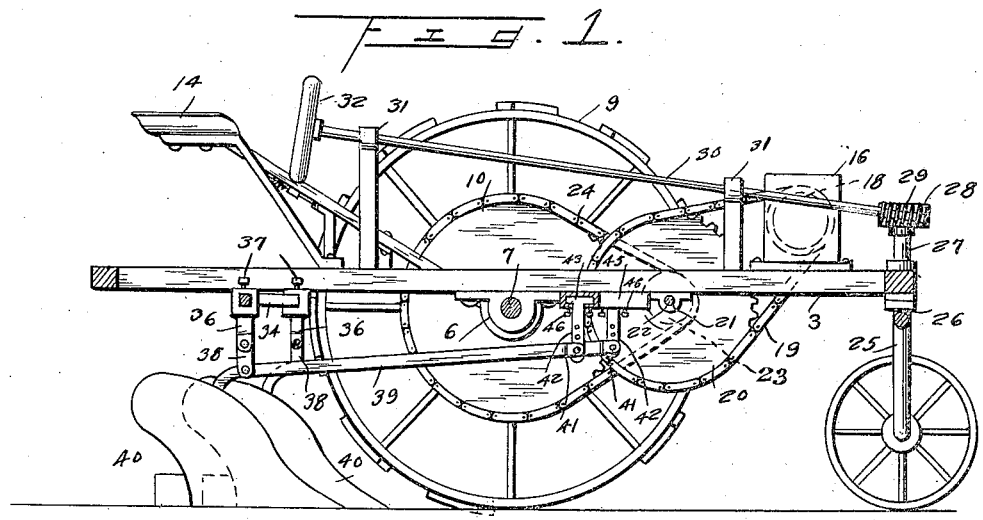
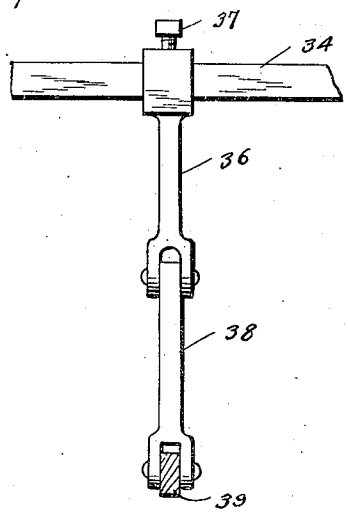
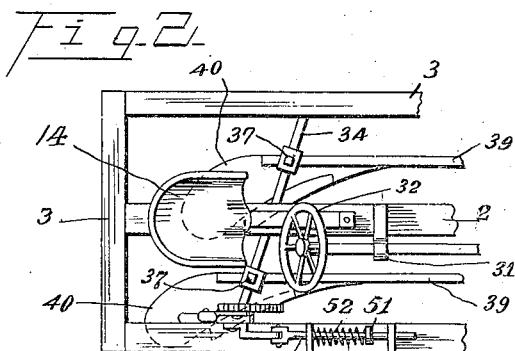

UNITED STATES PATENT OFFICE.

CHARLES J. WHITE, OF PAWNEE, LOUISIANA.

PLOW STRUCTURE.

1,359,850.  Specification of Letters Patent.  Patented Nov. 23, 1920.

Application filed February 21, 1919. Serial No. 278,477.

*To all whom it may concern:*

Be it known that I, CHARLES J. WHITE, a citizen of the United States, residing at Pawnee, in the parish of Allen and State of Louisiana, have invented certain new and useful Improvements in Plow Structures; and I do hereby declare the following to be a full, clear, and exact description of the invention, such as will enable others skilled in the art to which it appertains to make and use the same.

This invention relates to an improved plow of the tractor type and one object of the invention is to provide a tractor plow and an improved method of mounting a plow beam for vertical and transverse adjustment, the forward end portions of the plow beam being pivotally mounted and the rear portion connected with a rocker shaft whereby the plow carried by the beams may be swung out of engagement with the ground when the rocker shaft is rotated.

Another object of the invention is to so construct this plow mounting that the plow beams may be set a proper distance apart according to the type of plows which are carried by the beams.

Another object of the invention is to so construct this plow that it will be simple to operate and very efficient in its operation.

This invention is illustrated in the accompanying drawing wherein:

Figure 1 is a longitudinal sectional view of a plow constructed in accordance with my invention.

Fig. 2 is a fragmentary top plan view of the rear portion of the plow.

Fig. 3 is an enlarged detail of one of the adjustable plow hangers.

The main frame of the motor plow or tractor is indicated in general by the numeral 3 and carries bearing blocks 6 which rotatably support a transversely extending axle 7 on the ends of which are mounted the ground wheels 9 and upon which is also mounted the relatively large socket wheel 10. A relatively broad main drive wheel 9 is secured on the other end of the axle for propelling the tractor when the axle is rotated, this drive wheel being provided with suitable gripping elements or cleats extending transversely of the rim thereof at an inclination, as illustrated. A relatively large sprocket wheel 10 is mounted on the axle for free rotation adjacent the inner end of the hub of wheel 9, this sprocket wheel being provided at its inner face with an inwardly extending clutch element 11 which coöperates with a clutch member 12 feathered on the axle and shifted into and out of operative position by a shifting lever 13 mounted upon beam 1 and secured in adjustment by the usual spring pressed detent which coöperates with a rack 13 also carried by bar 1. This lever extends rearwardly so as to be readily accessible from the operator's seat 14 supported upon the central bar 2 by a standard 15 of well known construction.

An internal combustion engine 16 of suitable type is supported by the main frame adjacent the forward end thereof and gears provided with a relatively small sprocket wheel 18 which is connected by a sprocket chain 19 to a relatively large sprocket wheel 20 secured on a countershaft 21 extending transversely of the frame and rotatably supported in bearing blocks 22. This countershaft is provided with a relatively small sprocket 23 which is connected by a chain 24 to the relatively large sprocket wheel 10 rotatable on axle 7. When the engine is in operation rotation will be imparted to shaft 7 so as to rotate the main drive wheel 9 thus propelling the tractor.

A short crank axle 25 is provided at the front of the frame, this axle being provided at the center of its bight portion with a bearing plate 26 and a central vertical stub shaft 27 which is mounted for rotation through a suitable bearing sleeve carried by the front beam 4, this shaft being held against vertical movement by bearing and spacing collars in the known manner. A worm gear 28 is secured on the shaft 27 adjacent the upper end thereof and is in mesh with a worm 29 carried at the forward end of a steering post 30 rotatably supported in suitable standards 31 carried by the frame and provided with a steering wheel 32 at its rearward end positioned so as to be readily accessible from the seat 14.

For plowing purposes, a hanger shaft 34 is rockably mounted adjacent the rearward end of the frame, and at an inclination transversely thereof, in bearing blocks 35 carried by the beams 1, 2 and 3. This shaft is of substantial rectangular cross section and is provided with a plurality of hanger arms 36 adjustably secured thereon by set screws 37 or equivalent means. The lower ends of these arms are connected by links 38 to standards 39 of plows 40 of suitable type. The forward ends 41 of the plow-beams are connected by clevises to the stem portions 42 of T-shaped hangers 43 the heads 44 of which fit snugly in a channel beam 45 carried by the main frame adjacent the forward end thereof, this beam being inclined transversely of the frame in parallelism with the shaft 34. The hanger 43 is secured in adjustment in the beam by means of set screws 46 or in any other suitable manner, the hangers 43 as well as the hanger arms 36, being readily adjustable toward and away from each other to accommodate the required number of plows thus permitting the use of one or two relatively large or heavy plows, or of several relatively light plows, as well as securing proper and accurate adjustment of the plows. Also, when desired, the plows may be replaced by suitable cultivating plows, the front arched axle 25 being adapted to straddle rows of plants for cultivating purposes, thus readily adapting the machine for either plowing or cultivating operations.

For raising and lowering the plows or other implements carried by the shaft 16, a hand lever 47 is secured to the shaft in position to be readily accessible from seat 14. This lever is provided with a detent which coacts with a rack 48 carried by beam 3 to secure the lever in rocked adjustment. A substantially U-shaped bracket 49 is secured on the upper face of beam 3 and is provided with alined openings through its end arms which slidably receive a rod 50 adjacent the forward end of which is secured a collar 51 against which abuts the forward end of an expansion coil spring 52 mounted about the rod and confined between the collar and the rearward end arm 53 of the bracket. The rearward end of rod 50 is loosely secured to one end of a link 54 the rearward end of which is pivoted to lever 47 above the pivotal axis thereof. The spring acts through its expansive force to assist in raising the plows, thus permitting easy lifting of the same while providing a cushioning device to prevent the plows from being lowered too quickly and abruptly stopped.

It will be evident that there may be slight changes made in the construction and arrangement of the details of my invention without departing from the field and scope of the same, and I intend to include all such variations, as fall within the scope of the appended claim, in this application in which a preferred form only of my invention is disclosed.

What I claim is:

In a plow structure, a main supporting frame, a hanger shaft rockably supported thereby, means for operating said shaft, hanger arms carried by the hanger shaft and adjustable longitudinally thereof for connecting said shaft to plows suspended beneath the frame, a channel beam carried by the frame in advance of said hanger shaft, and hangers adjustable longitudinally of said beam and adapted to be connected to the forward ends of the beams of plows which are suspended from said hanger arms, the arms and the hangers coöperating to permit adjustment of the plows toward and away from each other transversely of the frame.

In testimony whereof I affix my signature, in presence of two witnesses.

CHARLES J. WHITE.

Witnesses:
V. CELL,
KATYE B. WORLEY.